United States Patent

[11] 3,588,505

| [72] | Inventor | Ralph T. Johnson, Jr. |
| --- | --- | --- |
| | | Albuquerque, N. Mex. |
| [21] | Appl. No. | 837,460 |
| [22] | Filed | June 30, 1969 |
| [45] | Patented | June 28, 1971 |
| [73] | Assignee | The United States of America as represented by the United States Atomic Energy Commission |

[54] METHOD AND APPARATUS FOR MEASURING FAST NEUTRON FLUENCES WITH CADMIUM SULFIDE OR CADMIUM SELENIDE
5 Claims, 4 Drawing Figs.

[52] U.S. Cl. ................................................. 250/83.1, 250/83.3R
[51] Int. Cl. ................................................ G01t 3/00
[50] Field of Search ........................................... 250/83.1, 83.3

[56] References Cited
UNITED STATES PATENTS

| 2,988,639 | 6/1961 | Welker et al. | 250/83.1 |
| 3,113,210 | 12/1963 | Hill | 250/83.1 |
| 3,201,590 | 8/1965 | Sun | 250/83.1X |

Primary Examiner—Archie R. Borchelt
Attorney—Roland A. Anderson

ABSTRACT: Apparatus and method for measuring neutron influences including a body of material having elements therein which are transmitted by irradiating neutrons into radioisotopes which decay by emission of radiation and produce ionization in the body of an amount relatable to the intensity of the neutron fluence. The neutron fluence is calculated by measuring the original conductivity of the body, exposing it to the neutron fluence, measuring the change in conductivity of the body due to the ionization from the decay of the radioisotopes transmuted by the neutrons, and computing the fluence, taking into account the time of decay of the radioisotopes; or, alternatively, after exposure to the neutron fluence detecting each ionization event, determining the event rate, and computing the fluence, taking into account the time of decay of the radioisotopes.

$\sigma = \dfrac{I\ell}{VA}$

INVENTOR.
Ralph T. Johnson, Jr.

3,588,505

METHOD AND APPARATUS FOR MEASURING FAST NEUTRON FLUENCES WITH CADMIUM SULFIDE OR CADMIUM SELENIDE

BACKGROUND OF INVENTION

Often in monitoring radioactive devices, such as nuclear reactors and the like to be enabled to measure neutron fluences is desirable. In many such instances, measuring devices may be required which are capable of measuring fast, intermediate and slow neutrons. (Generally, fast neutrons are understood to be those having energies in the range of about 10 Kev. to 14 Mev. and above; slow, or thermal neutrons, are those having energies in the range of about 1/25 ev. and below; and intermediate neutrons are those having energies between the fast and slow neutron energies.)

Although many neutron detection methods have been proposed, most rely upon prompt neutron effects for their operation. Such operation, however, may be undesirable since the detector must be observed in operation during the exposure period during which neutron fluence is to be measured. Another method presently used to measure neutron fluences involves placing a material which changes in electrical characteristics in proportion to the addition or deletion of particular impurities in the neutron field to be measured, and allowing the neutrons traversing the material to introduce those impurities by nuclear reactions with the atoms contained in the material. For example, if a piece of nickel oxide having a quantity of boron-10 doped thereinto is introduced into a neutron field, a certain amount of the boron-10 will be changed into lithium-7. Since boron-10 does not affect the electrical characteristics of nickel oxide in the same manner as the dopant lithium-7, the amount of dopant added or created in the material by the neutrons can be determined by measuring the conductivity before and after exposure to the neutron fluence, and the proportional intensity of the fluence can be computed.

A second method used is similar to the first except that dopant is removed by the incidence of neutrons. This may be done, for example by beginning with a nickel oxide body doped with lithium-6. When the material is placed in a neutron field, a portion of the lithium-6 is changed into hydrogen-3, which has little affect upon the electrical characteristics of nickel oxide. Again by measuring the resistance of the nickel oxide body before and after exposure to the neutron field the amount of dopant removed may be determined, and the neutron fluence computed.

The above-described methods rely primarily upon the direct production of dopant (or direct elimination of dopant) by the neutrons to be measured. Both methods, however, have undesirable characteristics. First, because a reaction with a neutron depends in part upon the cross section of the target nuclei (cross section being defined as a probability of nuclear reaction, and is measured in units of barns) which, in turn, is generally dependent upon the speed of the neutrons, to be at all efficient as a neutron fluence detector a large cross section must be presented. However, in doping by transmutation, as is the case in the prior art, large cross sections are very difficult to achieve because in order to produce (or eliminate) sufficient impurities to significantly and measurably change the resistance of the detector material, extremely large quantities of target nuclei are required. Also, since the cross section is generally dependent upon the speed of the impinging neutrons, the higher the energy of the neutrons to be detected the smaller the cross section presented. Consequently, the prior art methods and devices are fairly limited in use to detecting and measuring thermal neutrons. Additionally, the inherent efficiency and sensitivity of the devices used in the practice of the prior art methods are generally low because each neutron capture reaction produces or transmutes only one atom of a doping impurity. Hence, the overall effect of one neutron striking a target nuclei is practically negligible. Thus, in the induced doping-type detector large nuclear reaction cross sections are especially required since each neutron reaction has such a small effect on the overall conductivity.

An additional characteristic of the prior art devices is that in general they can be used only once; after having been irradiated with neutrons the devices are permanently and irreversibly doped and cannot be reused to detect additional fluences.

In practically all prior art devices, upon irradiation of the material of the detector device with neutrons, radiation induced defects or damage are often created. These defects may be, for example, local destructions of the crystal lattice of the material, and they, as well as the induced impurities, affect the resistivity of the material and the accuracy of the measurements. Under high fluences, in fact, the prior art devices may contain so many induced defects that any measurements after irradiation may be meaningless since the effect of impurity induced resistivity change may be very small compared to defect induced resistivity change.

SUMMARY OF INVENTION

In light of the prior art, therefore, it is an object of the invention to provide a method and apparatus for detecting neutron radiation of fast, intermediate, and slow neutrons.

It is another object to provide a method and apparatus for detecting neutron radiation using material having smaller nuclear reaction cross sections that materials heretofore used in induced doping type detectors.

It is a further object to provide a method and apparatus for detecting neutron radiation with much greater inherent sensitivity than heretofore attainable.

It is a still further object to present a method and apparatus which allows annealing the detector material to exclude the effects of neutron radiation induced defects created by the impinging neutrons, and, consequently, the eliminating measurement inaccuracies caused thereby.

It is a yet further object of the invention to present a method and apparatus for detecting neutron radiation which does not require the addition of doping impurities to the detector material.

These and other objects, features and advantages will become apparent from the following description of the invention when read in conjunction with the appended claims and attached drawing.

In accordance with the invention a method and detector for measuring neutron fluences are presented, the detector utilizing a material having elements therein which are transmuted into radioisotopes through capture reactions with neutrons. The radioisotopes thus transmuted emit radiation which induces ionization in the material which causes changes in the electrical properties of the material an amount related to the incident neutron fluence. Using this detector, then, the neutron fluence may be determined by measuring the conductivity of the material, exposing the material to the neutron environment the fluence of which is to be measured, remeasuring the conductivity of the material, and calculating the fluence utilizing a formula including factors representing the time from the occurrence of the neutron fluence, radioactive decay rate constant, and the nuclear reaction cross section of the material, and other material constant. The device of the invention may also be used as a detector in which each ionization event produces by the decay of a single radioisotope is observed, and, by thus determining the rate of decay, the neutron fluence may be calculated. Additionally, the optional step of annealing the material to rid it of neutron damage prior to measuring the ionization effects may be performed if desired.

BRIEF DESCRIPTION OF DRAWING

The invention is illustrated in the accompanying drawing wherein.

DESCRIPTION OF PREFERRED EMBODIMENT

Figure 1:
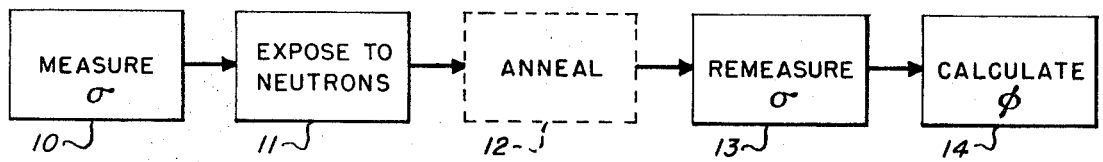
FIG. 1 is a block diagram illustrating the sequence of steps followed in practicing the method of the invention.

In accordance with the present invention, a method for measuring neutron fluence is presented which generally follows the steps outlined in the box diagram illustrated in FIG. 1. The first step, box 10, is measuring the conductivity of a body of material having elements either doped into the material or of the material itself which may be transmuted into radioisotopes through capture reactions with neutrons of suitable energy. Although it is desirable that the material be of relatively high resistivity of, perhaps, on the order of about 100 to $10^{10}$ ohm-cm. or higher, however, a low resistivity body may be used in conjunction with a high resistivity area forming a junction device rather than a single body. Satisfactory materials for the body may be of the insulator or semiconductor classes; it has been found that semiconductors generally selected from the class consisting of groups II and IV, and groups III and V semiconductors are particularly suitable. Of special use in the neutron fluence detector of the invention are materials of CdS, CdSe, CdTe, Si, Ge, GaAs and InSb, since these materials produce particularly desirable nuclear reactions with slow, intermediate, and fast neutrons.

To be understood at this juncture is that although throughout the description of the invention reference is made to the measuring of a conductivity, this phrase is intended to encompass the measuring of a resistivity as well, since it is well known that resistivity is the reciprocal of conductivity.

Figure 2:
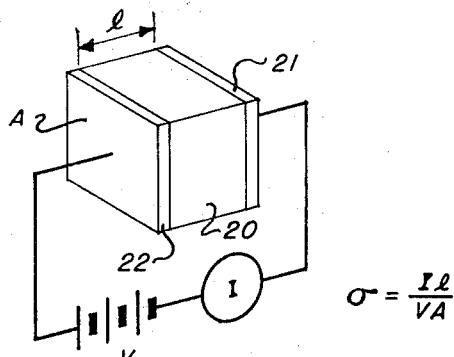
FIG. 2 is a diagrammatic representation of the device and equipment used in accordance with the invention.

The conductivity of the device may be measured as illustrated in FIG. 2. Simply, a voltage V is applied to the body 20, and the current I which flows therethrough measured. Electrical contact to the body may be made by any low resistance method, for example, by plating or wiping a film of indium-gallium or other conductive substances onto two or more surfaces of the body, such as the films 21 and 22 illustrated. The voltage may be then directly applied to the low resistance surfaces. From this information, the conductivity may then be determined by multiplying the quotient of the current and voltage by the quotient of the length, 1, and area, A, of the body 20.

Of course, although, as illustrated a voltage is applied and current measured, it is understood that the resistance of the body 20 may simply be measured with an ohmmeter, then converted to a conductivity, as above said.

The second step, box 11, is exposing the material to a neutron fluence, (neutron fluence, as used herein, denotes the total number of neutrons incident per unit area which is obtained by exposure to a neutron flux or field for a given period of time; hence, a time integrated flux.)

The third step, shown in dotted box 12, is annealing the material to eliminate any defects created in the material by the neutrons of the neutron fluence. The inclusion of this step in the process of the invention is significant since it has been heretofore impracticable to anneal the detector material before measurement since the detectors previously used relied upon a different principle of operation than that of the invention. Even though the step is important, however, it may be omitted from the method of the invention if the error introduced by the defects into the measurement is known so that it may be compensated for in the computation of the fluence. For the case of high resistivity CdS, for example, annealing may be accomplished by subjecting the CdS crystals to an annealing temperature of between about 100° C. to 400° C. for about 4 hours.

The fourth step of the invention, box 13, is remeasuring the conductivity of the crystal or material. The neutrons impinging upon the material may produce radioisotopes which decay by emission of nuclear radiation such as beta particles, which, in turn, impart energy to the material producing ionization, electron-hole pairs, which, if they have sufficiently long lifetimes significantly affect the conductivity of the material. Since this induced conductivity can be related to the number of incident neutrons upon the material, the fluence may then be calculated, box 14.

To calculate the neutron fluence in neutrons/cm.$^2$, the following technique may be used. Each activation reaction in a particular target material may be characterized by a macroscopic cross section, which is given by $$\Sigma = \sigma N \quad (\text{units cm.}^{-1}) \quad (1)$$

where $\sigma$ is the microscopic reaction cross section (units cm.$^2$) and N is the number of target nuclei per cm.$^3$. The number of radioisotopes, $A_o$, of a given kind produced per unit volume by the neutron fluence is given by $A_o = \sigma N \Phi = \Sigma \Phi$. The number of atoms of the radioisotopes at a particular (2) time, $t$, after irradiation is given by $$A = A_o exp(-\lambda t) \quad (3)$$

where $\lambda$ is the decay constant; $exp(-\lambda t)$ denotes the exponential dependence upon the product $(-\lambda t)$, here $exp$ denotes the base $e$ of the system of natural logarithms of value 2.71...; and $t$ is the time after irradiation (assuming for analysis that all $A_o$ nuclei were produced at the same time, $t=0$). Both the measured radioactivity and the electrical changes associated with radioactive decay are functions of the decay rate, which may be expressed as $$(-dA/dt) = \Sigma \lambda \Phi exp(-\lambda t). \quad (4)$$

$((-dA/dt)$ is just the rate at which radiation is emitted from the radioisotopes.)

The neutron fluence can be determined by writing equation 4 in the form $$\Phi = (\Sigma \lambda)^{-1}(-dA/dt)exp(\lambda t). \quad (5)$$

The parameters $\Sigma$ and $\lambda$ are either known or are usually easily determined for different materials and neutron reactions. Thus, $\Phi$ can be determined if $t$ and $(-dA/dt)$ are known.

The radioisotopes are randomly distributed throughout the detector medium and generally decay be emission of nuclear radiation (e.g. beta particles). This radiation as well as the charged recoiling nucleus may produce ionization such as the generation of electron-hole pairs; however the number of ionization events (radioactive decays) decreases with time according to equation 4. The rate of generation of electron-hole pair, $g$, is given by $$g = (E/\epsilon)(-dA/dt) \quad (6)$$

where E is the average energy absorbed in the material per radioactive decay from the nuclear radiation and the charged recoiling nucleus, and $\epsilon$ is the mean energy per electron hole pair (i.e. the means energy given up by the incident radiation in the process of generating an electron-hole pair).

The mean energy per electron-hole pair, $\epsilon$, which may have typical values for semiconductors of from 1 to 8 ev. is not significantly dependent on either the type or energy of the primary radiation. Thus, if radioisotopes decay by emission of about 1 Mev. radiation and if all the energy is absorbed in the material medium, there would be approximately $10^5 - 10^6$ electron-hole pairs generated per decay (in contrast to but one single impurity doping atom produced by the techniques of the prior art), thereby significantly reducing the required cross section to affect an appreciable change in conductivity, which, if the mobility lifetime product of the generated electrons or holes is sufficiently large can be readily detected.

The induced conductivity resulting from the generation of electron-hole pairs is given by $$\Delta\sigma = eg(\mu_n \tau_n + \mu_p \tau_p) \quad (7)$$

where $e$ is the electronic charge; $\mu_n$ and $\mu_p$ are the electron and hole mobilities, respectively, and $\tau_n$ and $\tau_p$ are the free lifetimes for electrons and holes, respectively. The relative importance of the electron and hole contributions depends on the material type (i.e., if a semiconductor whether intrinsic, N-type or P-type). It may be seen from equation 7 that induced conductivity from radioactive decay is proportional to the electron-hole generation rate, which in turn is proportional to the radioisotope decay rate as shown by equations 4 and 6. Since the decay rate can be determined from the induced conductivity, then the neutron fluence can be determined from the induced conductivity, then the neutron fluence can be determined from equation 5. Combining equations 5, 6, and 7 and solving from the neutron fluence yields the expression $$\phi = \frac{\Delta\sigma \epsilon \, exp(\lambda t)}{\Sigma \lambda e E (\mu_n \tau_n + \mu_p \tau_p)} \qquad (8)$$

These results show that the neutron fluence can be determined from the measured induced conductivity and other material and neutron-reaction parameters which are known or readily determined. For example, the mobilities and lifetimes of the charge carriers can be determined by independent experiments (such as Hall effect measurements and photoconductivity experiments). It is necessary of course to determine how the neutron irradiation affects such parameters if they are measured before irradiation.

For example, in CdS crystal, a reactor fast neutron fluence of about $10^{16}$ neutrons/cm.$^2$ will produce the following nuclear reactions with the indicated approximate concentrations.

| Reaction | Decay/half-life | Final product | Concentration, cm.$^{-3}$ |
|---|---|---|---|
| $^{32}S\,(n,p)\,^{32}P$ | Beta/14.3 days | $^{32}S$ | $5 \times 10^{12}$ |
| $^{33}S\,(n,\alpha)\,^{30}Si$ | Stable | $^{30}Si$ | $2 \times 10^{12}$ |
| $^{34}S\,(n,\alpha)\,^{31}Si$ | Beta/2.7 hr | $^{31}P$ | $8 \times 10^{7}$ |
| $Cd\,(n,\nu)\,^{110-113}Cd$ | Stable | $^{110-113}Cd$ | |
| $^{107}Cd$ | Electron capture/6.7 hours | $^{107}Ag$ | |
| $^{115}Cd$ | Beta/43 days, beta/2.3 days | $^{115}In$ | $1 \times 10^{13}$ |
| $^{117}Cd$ | Beta/2.7 hours | $^{117}In$ | |
| | ($^{117}In$: beta/45 min., beta/1.9 hr.) | $^{117}Sn$ | |

Figure 3:
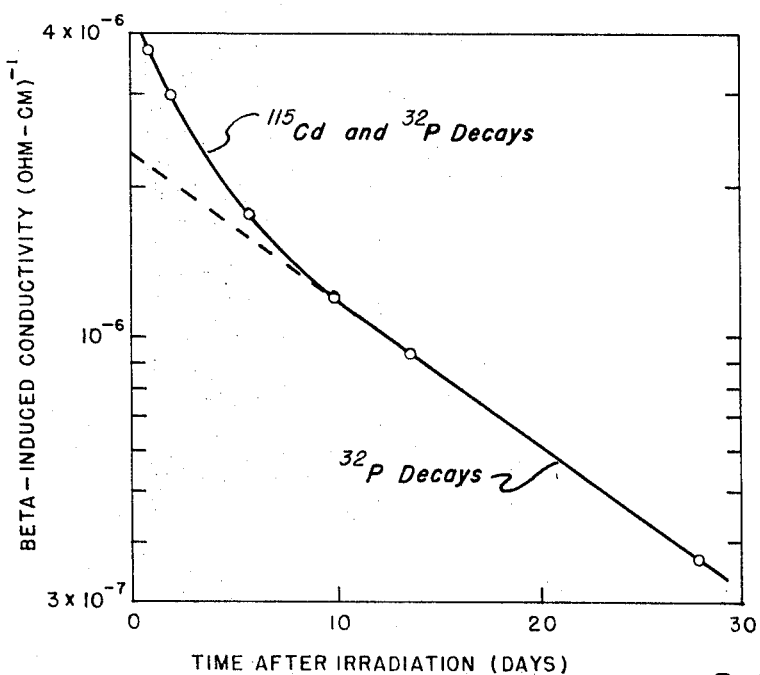
FIG. 3 is a graph illustrating the beta decays of $^{32}$P and $^{115}$Cd as affecting the conductivity of a body of CdS as a function of time.

Of the above reactions, of primary importance in a neutron detector are the $^{32}S\,(n,p)^{32}P$ and $Cd(n,\nu)^{115}Cd$ reactions, and of particular importance is the decay of $^{32}P$ to $^{32}S$ with a 14.3 day half life. As shown in FIG. 3, the decay of $^{115}Cd$ and $^{32}P$ causes a decreased conductivity (or increases resistivity) over a period of time, in accordance with equations 4 and 6 above. After a period of about 10 days, the contribution of $^{115}Cd$ to the conductivity becomes negligible in the overall effect compared to that of $^{32}P$. At any rate, it may be seen that since the conductivity at any time after exposure to the neutron fluence is relatable to the fluence, the fluence can readily be determined.

From the above, it may be seen that the conductivity need not be measured immediately, but may be measured at any convenient time, and, because the conductivity does change with time, more than one measurement may be taken to insure accuracy. Also, since after the radioisotopes have decayed, the device may be in its original condition and may be repeatedly reused.

As above-described the neutron detector of the invention may exhibit an overall change in conductivity from the totality or integrated effects of ionization events, or radioactive decays, occurring at any particular time. The device, however, depending on the material used, may be used as a single pulse detector in which each ionization event is observed. In some materials, the radioactive decays may be more efficiently detected as discrete pulses rather than as an integrated decay effect. Thus, each decay is discrete, and is countable, for example, by the circuit illustrated in FIG. 4. In the circuit, a body of material 30 is used, similar to the body 20 of FIG. 2, except that the radioactive decays occur at a countable or observable rate. Electrical contacts 31 and 32 are made to two faces of body 30, which are interconnected by voltage source V, in series with the parallel combination of a resistor R and a capacitor C. The output signal is observed across resistor R, and may be amplified, if desired.

Figure 4:
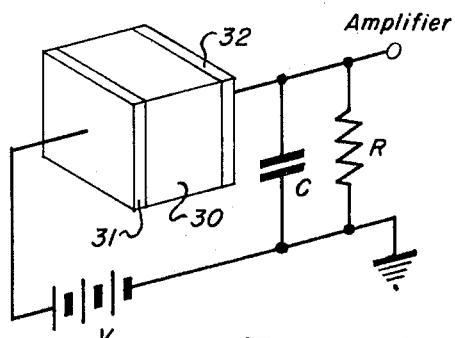
FIG. 4 is a diagrammatic representation of the device and equipment used in accordance with an alternative embodiment of the invention.

In operation, the circuit in FIG. 4 detects the ionization within body 30 by sweeping the ionized particles out of the body to charge the capacitor C and to change the voltage on the resistor R, the R–C circuit, in essence, acting as an instantaneous current detector. By observing the rate of ionization, which is, of course, proportional the rate of radioactive decay, the fluence may be directly calculated by equation 5 above.

The applications for the device are manifold. It may be used, for example, as above described as a fluence detector, or, it may be converted to a detector for measuring average flux merely by measuring the time duration of the neutron fluence, then converting the fluence to a flux by dividing by that time period. Additionally, neutron spectroscopy may be performed by using and comparing materials with different known nuclear reaction cross sections.

Although the invention has been described with a certain degree of particularity, it is understood that the present disclosure has been made by way of example and that numerous changes in the details of construction and the combination and arrangement of parts may be resorted to without departing from the spirit and scope of the invention.

I claim:

1. A detector for measuring fast neutron fluence comprising a body of resistive material having a large mobility lifetime product selected from the group consisting of CdS and CdSe a portion of the atoms of which are transmuted through capture reactions with fast neutrons into radioisotopes having half lives greater than several hours which decay to create ionization effects in said body, and means including a voltage source and current detector for measuring conductivity changes resulting from the ionization effects in said body due to the decay of said radioisotopes transmuted by said neutron fluence.

2. A method for measuring fast neutron fluence comprising exposing directly to a fast neutron fluence a body of resistive material having a large mobility lifetime product selected from the group consisting of CdS and CdSe, transmuting a portion of the atoms of said material through fast neutron capture reactions into radioisotopes having half lives greater than several hours, creating ionization effects in said body, counting said ionization effects due to said neutron fluence to be detected, and determining said fluence from the equation $$\Phi = (\Sigma \lambda)^{-1}(-dA/dt)\, exp(\lambda t)$$

where $\Phi$ = neutron fluence, $\Sigma$ = macroscopic reaction cross section, $\lambda$ = radioisotope decay constant, $dA/dt$ = radiation emission rate, and $t$ = time after irradiation.

3. The method of claim 2 additionally comprising determining said neutron fluence from the equation $$\phi = \frac{\Delta\sigma \epsilon \, exp(\lambda t)}{\Sigma \lambda e E (\mu_n \tau_n + \mu_p \tau_p)}$$

where $\Delta\sigma$ = induced conductivity, $\epsilon$ = mean energy per electron-hole pair, $e$ = electronic charge, E = average energy absorbed per radioactive decay, $\mu_n\tau_n$ = electron mobility lifetime product, and $\mu_p\tau_p$ = hole mobility lifetime product.

4. The method of claim 2 further comprising annealing said body after exposing to said neutron fluence and before counting said ionization effects.

5. The method of claim 4 where said body is of CdS and said annealing is done by exposing said body to a temperature of about 100° to 400° C. for about 4 hours.